United States Patent [19]

Dehan et al.

[11] Patent Number: 4,899,535
[45] Date of Patent: Feb. 13, 1990

[54] TURBOJET FUEL SUPPLY SYSTEM WITH FUEL RECYCLING

[75] Inventors: Gérard C. H. Dehan, Montgeron; Michel G. A. Doublier, Le Mee S; Gérard Greiner, Champigny, all of France

[73] Assignee: Societe Nationale D'Etude et de Construction de Moteurs d'Aviation "SNECMA", Paris, France

[21] Appl. No.: 229,473

[22] Filed: Aug. 8, 1988

[30] Foreign Application Priority Data

Aug. 12, 1987 [FR] France ................................ 87 11453

[51] Int. Cl.$^4$ ........................... F02C 7/14; F02C 7/224
[52] U.S. Cl. ...................................... 60/39.08; 60/730
[58] Field of Search .................... 60/39.08, 730, 734, 60/736

[56] References Cited

U.S. PATENT DOCUMENTS

| 3,300,965 | 1/1967 | Shenlow et al. | 60/39.08 |
| 4,041,697 | 8/1977 | Coffinberry et al. | 60/39.08 |
| 4,354,345 | 10/1982 | Dreisbach et al. | 60/39.08 |
| 4,741,152 | 5/1988 | Burr et al. | 60/39.08 |
| 4,773,212 | 9/1988 | Griffin et al. | 60/39.08 |

Primary Examiner—Louis J. Casaregola
Attorney, Agent, or Firm—Oblon, Spivak, McClelland, Maier & Neustadt

[57] ABSTRACT

In a turbojet fuel supply system in which a controlled flow of fuel ql is diverted from between the high pressure pump and the feed flow regulator and recycled upstream of the high pressure pump in order to maintain a substantially constant pressure differential cross the feed regulator, a flow qc is tapped from the hot flow ql for return to the fuel tank and to allow a correspondingly greater portion of cold fuel from the low pressure pump to be mixed with the recycled hot fuel ql delivered to the high pressure pump. If necessary, the tapped hot flow qc is mixed with a flow of cold fuel qf tapped from the low pressure pump output to form a lukewarm mixture qr for return to the tank.

9 Claims, 3 Drawing Sheets

TURBOJET FUEL SUPPLY SYSTEM WITH FUEL RECYCLING

BACKGROUND OF THE INVENTION

1. Field of the Invention

The invention relates to a fuel supply system, especially for a turbojet aero-engine, and is particularly concerned with fuel cooling means in such a system.

2. Summary of the Prior Art

Fuel supply systems in aircraft turbo-engines generally comprise a low pressure pump, usually of the centrifugal type, which receives fuel from a booster pump disposed in the fuel tank of the aircraft, and a high pressure displacement pump which receives fuel from the low pressure pump. On leaving the high pressure pump the fuel is delivered through a feed flow regulator towards an injection system.

A control valve in a branch at the outlet of the high pressure pump permits a portion of the fuel to be diverted and recycled upstream of the high pressure pump under the action of a control pressure in such a manner that the pressure drop across the feed flow regulator remains constant.

The fuel which flows in this type of supply system may be subjected to substantial temperature variations. For example, on issuing from the low pressure pump, the fuel may be at a temperature T1 of 20° C. or so, whereas after it has passed through the high pressure pump, and therefore into the control valve branch, the same fuel can have undergone heating which raises it to a temperature T2 close to 100° C., or even higher.

Furthermore, under certain flight conditions, at high altitude and low speed for example, the flow injected into the combustion chamber of the engine by the injection system is low, whereas the high pressure pump, rotating at high speed, has a high delivery rate. The portion of the flow diverted by the control valve is thus substantial, and the diverted fuel, at temperature T2, is reintroduced into the system upstream of the high pressure pump. The fuel which enters the high pressure pump is therefore a mixture of a relatively low proportion of "cold" fuel coming from the low pressure pump and a high proportion of recycled "hot" fuel coming from the control valve, and it is at a temperature T close to T2. As a result of this high temperature T at the inlet of the high pressure pump, the fuel is heated up still further and brings about a new high temperature T2. Such overheating of the fuel may bring about its decomposition (if the temperature T2 exceeds 150° C.) and cavitation phenomena in the high pressure pump.

In addition, if the fuel of the supply system is used as a cooling agent in a heat exchanger to cool, for example, oil circuits associated with the engine, excessive heating up of the fuel causes the latter to lose its cooling power. Such a heat exchanger is generally disposed in the fuel recycling circuit, downstream of the control valve or upstream of the high pressure pump, where conditions are the most favourable for its operation, for although the fuel there is hotter than at the outlet of the low pressure pump, the rate of flow there is much greater under the most critical conditions, particularly when flying at high altitude and low speed. However, with such an arrangement it is necessary in some critical cases to be able to reduce the temperature T2 if it is too high for the exchanger to play its part properly.

This problem could be solved by installing an air-fuel heat exchanger specifically to cool the fuel in the particular flight stages referred to above. However, the overall size and weight of such an exchanger, useful only in these particular flight stages, would penalize the performance of the engine and the aircraft in all other flight regimes.

SUMMARY OF THE INVENTION

According to the invention recourse to such a heat exchanger specifically for cooling the fuel is avoided by providing a fuel supply system for a turbojet aero-engine comprising:

- a fuel tank;
- a booster pump disposed in said fuel tank;
- a low pressure pump for receiving fuel delivered from said fuel tank by said booster pump;
- a high pressure displacement pump for receiving fuel delivered by said low pressure pump;
- a feed flow regulator for receiving fuel delivered by said high pressure pump;
- a fuel injection system for receiving a regulated supply of fuel from said feed flow regulator;
- a first branch for diverting a flow of fuel q1 from between said high pressure pump and said feed flow regulator and recylcing said diverted flow to said supply system at a point P1 between said low pressure pump and said high pressure pump, the fuel in said diverted flow q1 being hot after passage through said high pressure pump;
- a control valve in said first branch for controlling said diverted flow q1 so as to maintain substantially constant the difference between the fuel pressures upstream and downstream of said feed flow regulator;
- a second branch for tapping a flow of hot fuel qc from said diverted flow q1 at a point P2 in said first branch between said control valve and said point and,
- return means for returning said tapped flow qc to said fuel tank;

whereby the temperature of said fuel delivered to said high pressure pump is lowered as a result of the portion of cold fuel received from said low pressure pump increasing by an amount equal to said flow qc tapped from said hot fuel flow q1 recycled to said point P1 for delivery to said high pressure pump with said cold fuel from said low pressure pump.

The tapped flow qc of hot fuel may be returned directly to the fuel tank, but if the temperature of the fuel is too high for this, by virtue of the relatively low temperature stability of relevant structures of the aircraft and of the tank, the flow qc is preferably first mixed with a flow qf of cold fuel also derived from the system.

For this purpose the system may be provided with a third branch for tapping a flow of cold fuel qf from a point Po between said low pressure pump and said point P1 and a mixing device for mixing said flow of hot fuel qc with said flow of cold fuel qf to form a flow qr of lukewarm fuel for return to said fuel tank by said return means.

The mixing device may comprise means for controlling the flow qc of hot fuel and the flow qf of cold fuel so that these flows are kept more or less constant, and preferably also means for adjusting this control to obtain a proportional change in the flows.

If the fuel supply system in accordance with the invention includes a heat exchanger which is intended to use the fuel as a cooling agent, the exchanger is preferably disposed either between the control valve and the point P2 at which the flow qc of hot fuel is tapped, or between the point P1 and the inlet of the high pressure pump.

DESCRIPTION OF THE PREFERRED EMBODIMENTS

Figure 1:
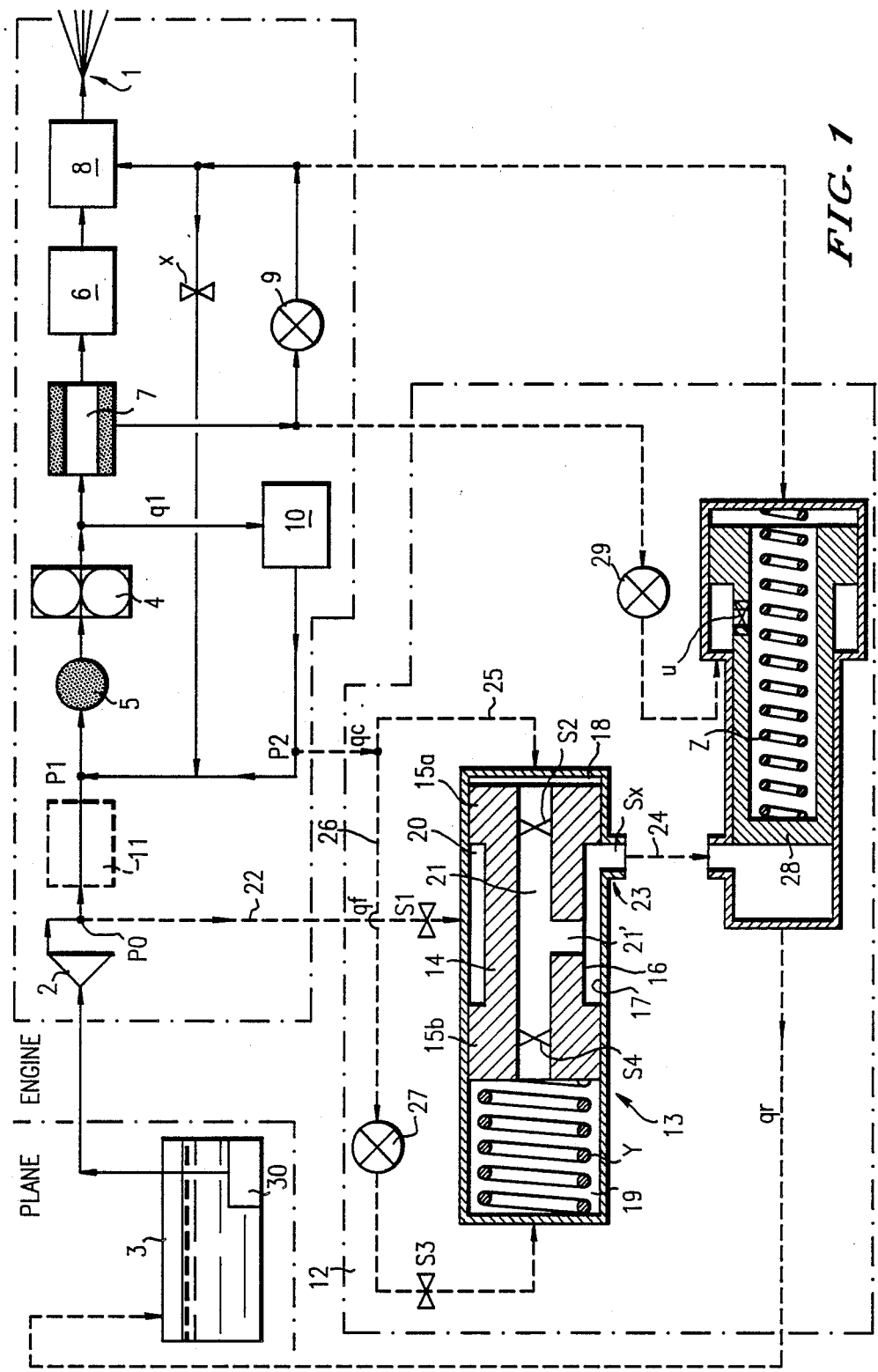
FIG. 1 of the drawings show a schematic representation of a fuel supply system in accordance with a first embodiment the invention.

In the drawings a system for supplying fuel to each one of a plurality of injectors 1 of the combustion chamber in a turbo-engine is shown which comprises a main flow path in which a low pressure pump 30 2 receives fuel from a booster pump situated in a fuel tank 3 of the aircraft. The fuel is delivered by the low pressure pump 2 to a high pressure pump 4 through a main filter 5 and then, by the high pressure pump 4, through a feed flow regulator 6 (which may be preceded by a servo-filter 7) to the injectors 1 via a stop valve 8 controlled by a solenoid valve 9 fed with fuel from the servo-filter 7.

A control valve 10, mounted in a branch between the high pressure pump 4 and, if present, the servo filter 7, enables a portion q1 of the fuel flow downstream of the high pressure pump 4 to be diverted and returned upstream of the high pressure pump 4, under the action of a control pressure, so that the pressure drop across the feed flow regulator 6, (i.e., the difference between the pressures Pam upstream and Pav downstream of the feed flow regulator 6) device, remains constant. Means for measuring the pressure drop and for deriving the control pressure for the control valve 10 are not shown.

The flow q1 of fuel diverted by the control valve 10 is returned to the main flow path at a poinat P1 situated between the low pressure pump 2 and the high pressure pump 4. In this example, the point P1 is upstream of the main filter 5.

The stop valve 8 prohibits the flow of fuel to the injectors 1 when the solenoid valve 9 is open. When the solenoid valve 9 is closed, the excess fuel contained between the stop valve 8 and the solenoid valve 9 returns to the point P1 through a small constriction x.

Figure 3:
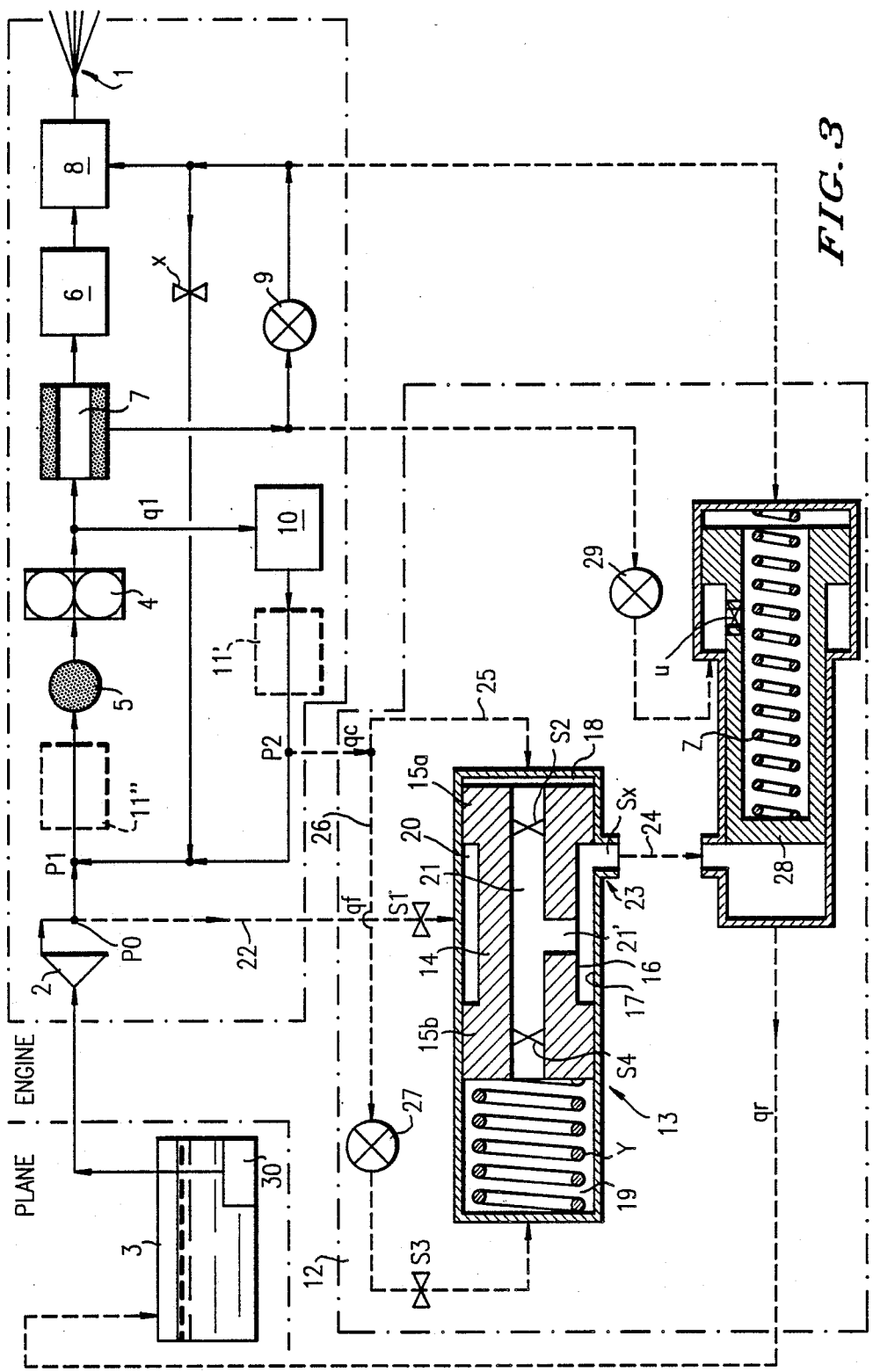
FIG. 3 of the drawings shows a schematic representation of a fuel supply system in accordance with a third embodiment of the invention.

The fuel which flows in this supply system may be used as the cooling agent of a heat exchanger for cooling auxiliary systems (for example, lubricating oil circuits for the bearings of the engine). Such a heat exchanger may be inserted at any suitable point of the fuel system, for example between the low pressure pump 2 and the point P1 where the diverted flow q1 is returned to the main flow path, as shown by the dotted lines indicated by reference 11 in FIGS. 1 and 3. At this point of the system, the fuel has not yet been heated, and its temperature T1 is low, 20° C. being a typical value for purposes of illustration.

Figure 2:
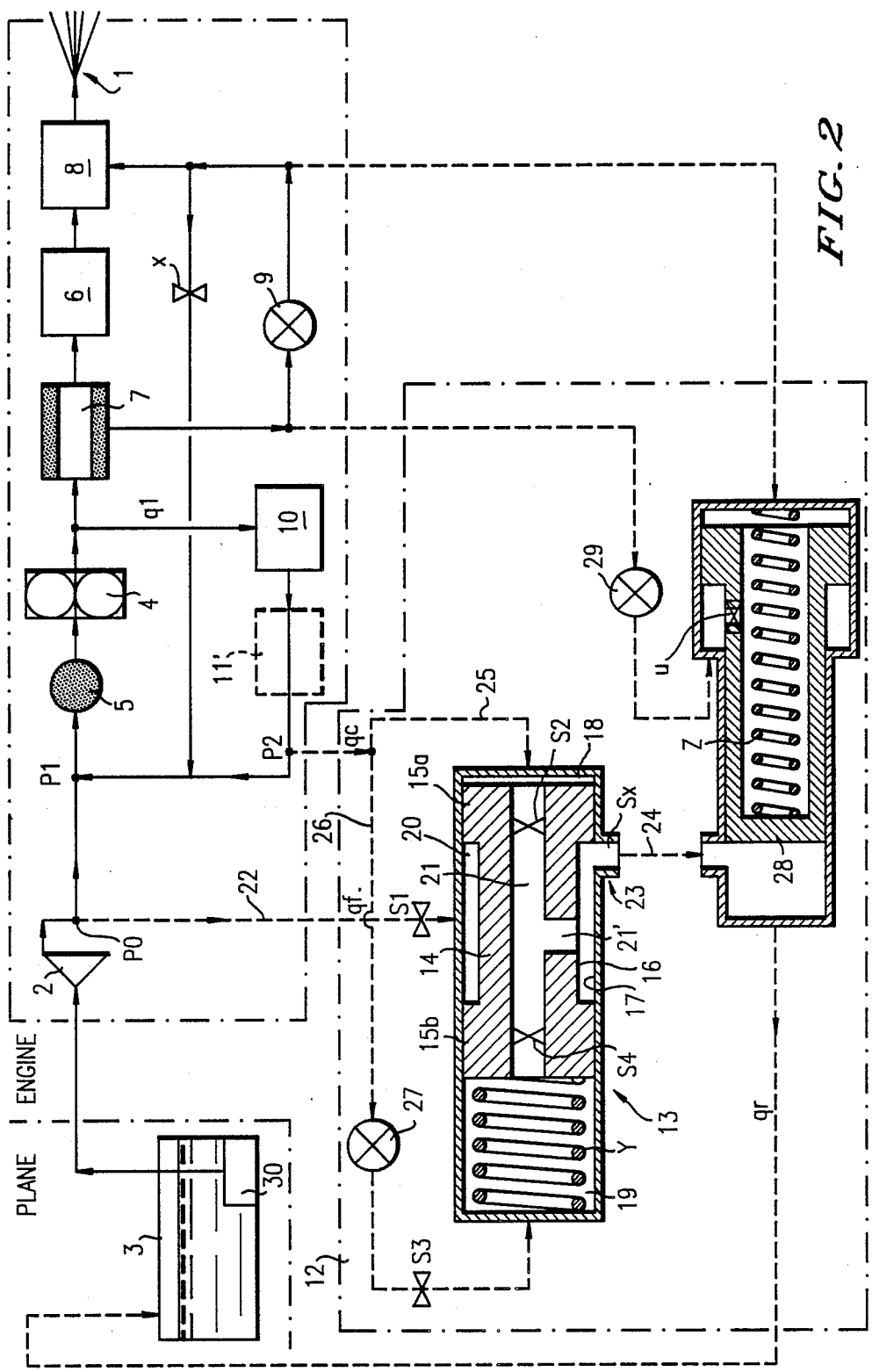
FIG. 2 of the drawings shows a schematic representation of a fuel supply system in accordance with a second embodiment of the invention.

However, it may be preferred to place such a heat exchanger in the return loop of the diverted flow q1, between the control valve 10 and the point P1 such as indicated by reference 11' in FIG. 2. Although this arrangement is less favourable than that described above, since the temperature T2 of the fuel at the output of the control valve 10 is higher (about 100° C. as an indication) as a result of heating during passage of the fuel through the high pressure pump 4, the fuel flow in this loop is much more even than in the first position. In particular, it is much greater under the critical conditions of flight at high altitude and low speed, which enables it to shed more calories under these conditions in spite of its higher temperature, provided the latter is not excessive.

An even better arrangement is to place the heat exchanger indicated by reference 11 between the point P1 and the inlet of the high pressure pump 4 (i.e., in a position close to the main filter 5), where the temperature T is lower than the temperature T2 indicated above and the flow is permanently that which passes through the high pressure pump 4 and is therefore greatest.

The hot fuel diverted by the control valve 10 is mixed at temperature T2, or higher if it has received calories from the heat exchanger 11', at P1 with the cold fuel at temperature T1 from the low pressure pump. To prevent excessive heating of the fuel, a flow qc is taken from the diverted hot flow q1 at a point P2 situated downstream of the control valve 10 in the return circuit (and downstream of the exchanger 11' if there is one).

If the parts of the aircraft and of the fuel tank can withstand such a temperature, this flow qc may be delivered directly to the fuel tank 3. However, if this is not the case, a flow qf of cold fuel is taken from the main flow upstream of any source of heating of the fuel (e.g., at a point Po situated between the low pressure pump 2 and the point P1 and upstream of the heat exchanger 11 if there is one), and the flow of is mixed with the flow qc of hot fuel taken at the point P2 by means of a mixing device indicated generally by the reference 12, so as to form a flow qr of lukewarm fuel which is returned to the fuel tank 3.

The mixing device 12 comprises a mixer valve 13 having a housing 17 containing a spool 14 provided with two lands $15a, 15b$ separated by a central recess 16 of reduced diameter. The spool 14 defines with the housing 17 two end chambers 18, 19 and a central chamber 20, the three chambers being interconnected by an axial bore 21 and a radial bore 21'. The central chamber 20 receives the flow qf of cold fuel from the point Po along a conduit 22 and has a recess 23 connected to an outlet pipe 24 for the lukewarm fuel flow qr, while the end chamber 18 receives the flow qc of hot fuel along a conduit 25. The end chamber 19 contains a spring y bearing against the end of the end chamber 19 and acting on the land $15b$ of the spool 14.

Means for regulating the cold fuel flow qf and the hot fuel flow qc to the mixer valve 13 is formed by the combination of a first throttle S1 of fixed section mounted in the conduit 22, a second throttle S2 of fixed section located in the axial bore 21 leading from the end chamber 18, and a throttle Sx of variable section formed between the recess 23 of the central chamber 20 and the land $15a$ of the spool 14.

In operation of the mixer valve 13, the section of the throttle Sx is dependent upon the position of the spool 14, which is itself dependent upon the difference between the pressures acting on the end faces of the lands $15a$ and $15b$ against the spring y. As the spring y is weak, this throttle Sx may be regarded as maintaining almost constant the difference between the pressures in the two end chambers 18 and 19, and thus also the difference between the pressures in the two end chambers 18 and 20 (i.e., between the upstream and downstream pressures of the two throttles S1 and S2). As the throttles S1 and S2 have fixed sections and are supplied with fuel at the more or less constant delivery pressure of the low pressure pump 2, the flows qf and qc which pass through them are also constant and proportional to their sections.

To increase the flow qc of the hot fuel tapped by the mixing device 12 without increasing the temperature of the flow qr of lukewarm fuel returned to the fuel tank 3, the mixing includes means for varying the metering of the flows qc and qf which are taken. This means comprises a conduit 26 interconnecting the conduit 25 for the hot fuel flow qc and the end chamber 19 of the mixer valve 13, the conduit 26 including in series a solenoid valve 27 and a third throttle S3 of fixed section, and a fourth throttle S4 of fixed section located in the axial bore 21 leading from the end chamber 19.

When the solenoid valve 27 is open, it lets a small flow of hot fuel through the two throttles S3 and S4, which are in series and are of small section. The pressure prevailing in the end chamber 19 then becomes intermediate between the pressure upstream of the throttles S1, S2, S3 and that in the central chamber 20. To restore balance, the spool 14 moves to the right, increasing the section Sx and lowering the pressure in the central chamber 20. Consequently, the flows qf and qc which pass through the throttles S1 and S2 increase proportionally.

The mixing device 12 described above may also comprise a return valve 28 disposed in the outlet pipe 24, the opening and closure of which is effected by the opening and closure of a solenoid valve 29 supplied with control fuel from the servo-filter 7 and acting against a spring Z associated with the return valve 28. The two control chambers of the return valve 28 are joined together by a passage u of small section, and the second control chamber of the return valve 28 is connected to the output of the solenoid valve 9 controlling the stop valve 8.

By this means, when the solenoid valve 29 closes, the excess fuel in the return first chamber of the valve 28 leaks into the second chamber and enables return valve 28 to close under the action of the spring Z. When the solenoid valve 29 opens, the excess fuel in the second chamber escapes through the return throttle X and enables the valve 28 to open. Moreover, when the solenoid valve 9 opens to shut-off the passage of fuel to the injectors, it also closes the return valve 28 and hence the path for the return of fuel to the fuel tank 3.

The foregoing description relates to a fixed throttle section S3 and a solenoid valve 27 with an all-or-nothing opening control. As a result, the flow qc of hot fuel tapped from q1 changes from a first value to a greater, second discrete value when the solenoid valve 27 opens. However, if the throttle S3 has a variable section, then it is possible to achieve a progressive variation of the flows of hot fuel qc and cold fuel qf which are tapped.

One advantage of the invention is that the flow of fuel through the heat exchanger is not modified by the system in accordance with the invention, whatever the position occupied by the exchanger in the system.

Another advantage is that the temperature of the fuel returning to the tank may be, when using a mixing device, very different from the temperature of the fuel issuing from the heat exchanger. In the flight regimes considered, this is an important parameter, which confirms the benefit of the system in accordance with the invention.

What is claimed is:
1. Fuel supply system for a turbojet aero-engine comprising:
   (a) a fuel tank;
   (b) a booster pump disposed in said fuel tank;
   (c) a low pressure pump for receiving fuel delivered from said fuel tank by said booster pump;
   (d) a high pressure pump for receiving fuel delivered by said low pressure pump;
   (e) a feed flow regulator for receiving fuel delivered by said high pressure pump;
   (f) a fuel injection system for receiving a regulated supply of fuel from said feed flow regulator;
   (g) a first branch for diverting a diverted flow of fuel q1 from beteen said high pressure pump and said feed flow regulator and recycling said diverted flow of fuel q1 to said supply system at a point P1 between said low pressure pump and said high pressure pump, the fuel in said diverted flow of fuel q1 being hot after passage through said high pressure pump;
   (h) a control valve in said first branch for controlling said diverted flow of fuel q1 so as to maintain substantially constant the difference between the fuel pressures upstream and downstream of said feed flow regulator;
   (i) a second branch for tapping a tapped flow of hot fuel qc from said diverted flow of fuel q1 at a point P2 in said first branch between said control valve and said point P1;
   (j) return means for returning said tapped flow of hot fuel qc to said fuel tank;
   (k) a third branch for tapping a flow of cold fuel qf from a point P0 between said low pressure pump and said point P1; and
   (l) a mixing device for mixing said tapped flow of hot fuel qc with said flow of cold fuel qf to form a flow qr of lukewarm fuel for return to said fuel tank by said return means,
   whereby the temperature of said fuel delivered to said high pressure pump is lowered as a result of the portion of cold fuel received from said low pressure pump increasing by an amount equal to said tapped flow of hot fuel qc tapped from said diverted flow of fuel q1 recycled to said point P1 for delivery to said high pressure pump with said cold fuel from said low pressure pump.

2. Fuel supply system according to claim 1, wherein said mixing device comprises means for controlling said tapped flow of hot fuel qc and said flow of cold fuel qf such that those flows are maintained substantially constant.

3. Fuel supply system according to claim 2, wherein said mixing device includes means for adjusting the control of said flows qc and qf to obtain a proportional change in these flows.

4. Fuel supply system according to claim 1, wherein said mixing device comprises:
   (a) a mixer valve, said mixer valve having a spool provided with two lands and a reduced diameter central portion separating said two lands;
   (b) a housing slidably receiving said spool and defining therewith first and second end chambers and a central chamber; and
   (c) a spring disposed in said second end chamber acting to bias said spool towards said first end chamber,
   wherein:

(d) said first end chamber communicates with said second branch for receiving said tapped flow of hot fuel qc;
(e) said central chamber communicates with said third branch for receiving said flow of cold fuel qf;
(f) said spool has means defining an axial bore and a radial bore interconnecting said two end chambers and said central chamber; and
(g) said housing has means defining an outlet port communicating said central chamber with said return means for said flow qr of lukewarm fuel.

5. Fuel supply system according to claim 4, wherein said mixing device includes means for controlling said flow qf of cold fuel and said flow qc of hot fuel such that these flows are maintained substantially constant, said means for controlling comprising:
(a) a first throttle of fixed section disposed in said third branch communicating said point P0 with said central chamber of said mixer valve;
(b) a second throttle of fixed section located in said axial bore leading from said first end chamber to said radial bore communicating with said central chamber; and
(c) a throttle of variable section formed at said outlet port of said central chamber by one of said lands of said spool in co-operation with said outlet port.

6. Fuel supply system according to claim 5, wherein said mixing device includes means for adjusting said control of said flows qc and qf to obtain a proportional change in said flows, said adjusting means comprising:
(a) a conduit connecting said second branch and second end chamber of said mixer valve, said conduit including in series a solenoid valve and a third throttle, and
(b) a fourth throttle of fixed section located in said axial bore leading from said second end chamber to said radial bore communicating with said central chamber.

7. Fuel supply system according to claim 1, wherein said return means includes a return control valve between said mixer device and said fuel tank.

8. Fuel supply system according to claim 1, wherein a heat exchanger is disposed in said first branch between said control valve and said point P2 at which said flow qc of hot fuel is tapped, said flow of fuel q1 through said heat exchanger acting as a cooling agent.

9. Fuel supply system according to claim 1, wherein a heat exchanger is disposed in the fuel flow path between said point P1 and said high pressure pump, said fuel flowing through said heat exchanger acting as a cooling agent.

* * * * *

UNITED STATES PATENT AND TRADEMARK OFFICE
CERTIFICATE OF CORRECTION

PATENT NO. : 4,899,535

DATED : FEBRUARY 13, 1990

INVENTOR(S) : GERARD C. H. DEHAN ET AL.

It is certified that error appears in the above-identified patent and that said Letters Patent is hereby corrected as shown below:

In column 2, line 25 delete "recylcing" and insert --recycling--;

In column 2, line 37 delete "and," and insert --P1; and--;

In column 3, line 22 delete "30";

In column 3, line 23 after "a pump booster" insert --30--;

In column 3, line 33 delete "servo filter" and insert --servo-filter--;

In column 3, line 38 delete "device" after "regulator 6)";

In column 3, line 42 delete "poinat" and insert --point--;

In column 4, line 11 delete "11" and insert --11"-- after "reference";

In column 5, line 48 insert --1-- after "injectors";

In column 4, line 32 insert --qf-- after "flow", first occurrence;

UNITED STATES PATENT AND TRADEMARK OFFICE
CERTIFICATE OF CORRECTION

PATENT NO. : 4,899,535

DATED : FEBRUARY 13, 1990

INVENTOR(S) : GERARD C. H. DEHAN ET AL.

It is certified that error appears in the above-identified patent and that said Letters Patent is hereby corrected as shown below:

In column 6, line 15 delete "beteen" and insert --between--;

In column 5, line 10 insert --device 12-- after "mixing".

Signed and Sealed this

Fifth Day of November, 1991

*Attest:*

HARRY F. MANBECK, JR.

*Attesting Officer*      *Commissioner of Patents and Trademarks*